United States Patent
Steely, Jr. et al.

(10) Patent No.: US 7,962,696 B2
(45) Date of Patent: Jun. 14, 2011

(54) SYSTEM AND METHOD FOR UPDATING OWNER PREDICTORS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2070 days.

(21) Appl. No.: 10/758,368

(22) Filed: Jan. 15, 2004

(65) Prior Publication Data

US 2005/0160430 A1   Jul. 21, 2005

(51) Int. Cl.
*G06F 12/08* (2006.01)
(52) U.S. Cl. ........ 711/145; 711/141; 711/144; 711/204; 711/205; 711/124; 711/137; 711/156; 711/165; 711/213
(58) Field of Classification Search .................. 711/141, 711/144, 145, 204, 205, 124, 137, 156, 165, 711/213
See application file for complete search history.

(56) References Cited

U.S. PATENT DOCUMENTS

| | | | |
|---|---|---|---|
| 5,355,467 A | 10/1994 | MacWilliams et al. | |
| 5,802,577 A | 9/1998 | Bhat et al. | |
| 5,819,105 A | 10/1998 | Moriarty et al. | |
| 5,829,040 A | 10/1998 | Son | |
| 5,875,467 A | 2/1999 | Merchant | |
| 5,875,472 A | 2/1999 | Bauman et al. | |
| 5,958,019 A | 9/1999 | Hagersten et al. | |
| 6,052,760 A | 4/2000 | Bauman et al. | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,345,342 B1 | 2/2002 | Arimilli et al. | |
| 6,356,918 B1 | 3/2002 | Chuang et al. | |
| 6,408,363 B1 * | 6/2002 | Lesartre et al. | |
| 6,457,100 B1 * | 9/2002 | Ignatowski et al. | |
| 6,457,101 B1 * | 9/2002 | Bauman et al. | |
| 6,490,661 B1 * | 12/2002 | Keller et al. | |
| 6,523,138 B1 | 2/2003 | Natsume et al. | |
| 6,546,465 B1 | 4/2003 | Bertone | |
| 6,587,921 B2 * | 7/2003 | Chiu et al. | |
| 6,615,343 B1 * | 9/2003 | Talcott et al. | |
| 6,631,401 B1 * | 10/2003 | Keller et al. | |
| 6,633,960 B1 | 10/2003 | Kessler et al. | |
| 6,633,970 B1 * | 10/2003 | Clift et al. | |
| 6,766,360 B1 | 7/2004 | Conway et al. | |

(Continued)

FOREIGN PATENT DOCUMENTS

EP    1 162 542    12/2001

OTHER PUBLICATIONS

Rajeev, Joshi, et al., "Checking Cache-Coherence Protocols with TLA+", Kluwer Academic Publishers, 2003, pp. 1-8.

(Continued)

*Primary Examiner* — Midys Rojas

(57) ABSTRACT

Systems and methods are disclosed for updating owner predictor structures. In one embodiment, a multi-processor system includes an owner predictor control that provides an ownership update message corresponding to a block of data to at least one of a plurality of owner predictors in response to a change in an ownership state of the block of data. The update message comprises an address tag associated with the block of data and an identification associated with an owner node of the block of data.

28 Claims, 5 Drawing Sheets

U.S. PATENT DOCUMENTS

| | | | |
|---|---|---|---|
| 6,961,827 B2 | 11/2005 | Shanahan et al. | |
| 7,380,107 B2 * | 5/2008 | Steely et al. | 711/141 |
| 2001/0034815 A1 | 10/2001 | Dugan et al. | |
| 2002/0009095 A1 | 1/2002 | Van Doren et al. | |
| 2002/0073071 A1 | 6/2002 | Pong et al. | |
| 2002/0133674 A1 * | 9/2002 | Martin et al. | 711/141 |
| 2002/0144063 A1 | 10/2002 | Peir et al. | |
| 2003/0018739 A1 | 1/2003 | Cypher et al. | |
| 2003/0140200 A1 | 7/2003 | Jamil et al. | |
| 2003/0145136 A1 | 7/2003 | Tierney et al. | |
| 2003/0195939 A1 | 10/2003 | Edirisooriya et al. | |
| 2003/0200397 A1 | 10/2003 | McAllister et al. | |

OTHER PUBLICATIONS

Martin, Milo M.K., et al., "Token Coheence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, (Date Unknown).

Gharachorloo, Kourosh, et al., "Memory Consistency and Event Ordering in Scalable Shared-Memory Multiprocessors", Computer Systems Laboratory, pp. 1-14, (Date Unknown).

Jim Handy, The Cahe Memory Book, 1993; p. 153 line 29 to p. 154 line 24; p. 169.

Rajeev, Joshi et al., "Checking Cache-Coherency Protocols with TLA+", Journal of Formal Methods in System Design. vol. 22, No. 2, Mar. 2003, pp. 125-131, Springer, Netherlands.

Acacio, Manual E. et al, "Owner Prediction for Accelerating Cache-to-Cache Transfer Misses in cc-NUMA Multiprocessors," SC2002 High Performance Networking and Computing, pp. 49-60, Nov. 2002, IEEE Computer Society Press, Los Alamitos, CA.

Jim Handy, "The Cache Memory Book", Academic Press, Inc., copyright 1993, 5 pages.

Office Action, dated Jan. 11, 2007, U.S. Appl. No. 10/758,473, 13 pages.

Notice of Allowance, dated May 3, 2007, U.S. Appl. No. 10/758,473, 8 pages.

* cited by examiner

SYSTEM AND METHOD FOR UPDATING OWNER PREDICTORS

RELATED APPLICATION

This application is related to the following commonly assigned patent applications entitled, "SYSTEM AND METHOD FOR PROVIDING PARALLEL DATA REQUESTS," which is being filed contemporaneously herewith and is incorporated herein by reference, granted as U.S. Pat. No. 7,240,165 on Jul. 3, 2007.

BACKGROUND

Multi-processor systems employ two or more computer processors that can communicate with each other, such as over a bus or a general interconnect network. In such systems, each processor may have a memory cache (or cache store) that is separate from the main system memory. Each individual processor can directly access memory caches of other processors. Thus, cache memory connected to each processor of the computer system can often enable fast access to data. Caches can reduce latency associated with accessing data on cache hits and reduce the number of requests to system memory. In particular, a write-back cache enables a processor to write changes to data in the cache without simultaneously updating the contents of memory. Modified data can be written back to memory at a later time if necessary.

Coherency protocols have been developed to ensure that whenever a processor reads a memory location, the processor receives the correct or true data. Additionally, coherency protocols ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a multi-processor system. The multi-processor system may include an owner predictor control that provides an ownership update message corresponding to a block of data to at least one of a plurality of owner predictors in response to a change in an ownership state of the block of data. The update message may comprise an address tag associated with the block of data and an identification associated with an owner node of the block of data.

Another embodiment of the present invention may comprise a multi-processor network. A first processor may include a cache having a plurality of cache lines associated with respective blocks of data. One cache line may transition to an ownership state based on a response to a request provided by the first processor. A second processor may include an associated owner predictor. An owner predictor control may provide an update message to at least the owner predictor associated with the second processor to identify ownership for the one cache line at the second processor consistent with the one cache line transitioning to the ownership state.

A further embodiment of the present invention may comprise a system including a requesting node that provides a first request for a block of data to a home node. The requesting node may be operative to provide a second request for the block of data to at least one predicted node substantially in parallel with first request. The requesting node may receive at least one coherent copy of the block of data from at least one of the home node and the at least one predicted node. The system may further comprise an owner predictor associated with the requesting node. The owner predictor may be programmed to identify the at least one predicted node. An update control may provide an ownership update message to the owner predictor in response to a detecting a change in an ownership state for the block of data. The update message may comprise an address tag associated with the block of data and a processor identification associated with an owner node of the block of data.

Yet another embodiment of the present invention may comprise a multi-processor system that includes means for identifying a predicted owner node associated with a block of data. The means for predicting may be associated with a requesting node. The system may also comprise means for selectively providing a request for the block of data from the requesting node to the predicted owner node. The system may further comprise means for updating the means for predicting in response to a change in ownership of the block of data. The means for updating may be remote from the means for predicting.

Still another embodiment of the present invention may comprises a method that includes updating ownership state information for a block of data at a plurality of owner predictors associated with respective processors based at least in part on a change in the ownership state of the block of data. The method may further include identifying at least one of the processors as a predicted owner node based on the updated ownership state information in an owner predictor associated with at least one of the processors.

DETAILED DESCRIPTION

This disclosure relates generally to a system utilizing a distributed owner prediction arrangement that tracks a probable owner for one or more cache lines. A plurality of processors can include respective owner predictors that store entries corresponding to a cache line and a probable owner. An owner predictor update control can provide update messages to the owner predictors. These update messages can correspond to changes of ownership in one or more of the cache lines. When a processor attempts to obtain a copy of data for a given cache line, the processor's associated owner predictor can be accessed to determine a predicted owner of the data. When the processor requests the data from the system, a second request can be provided directly to the predicted owner to reduce latency associated with retrieving the data.

Figure 1:
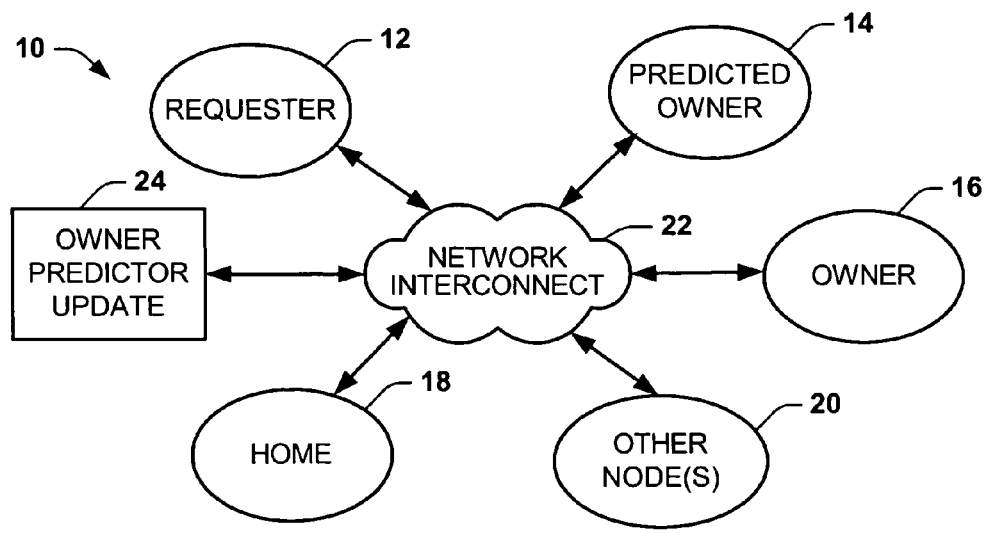
FIG. 1 depicts a schematic diagram of a multi-processor network.

FIG. 1 depicts an example of a multi-processor network 10. The network 10 includes a requester node 12, a predicted node 14, an owner node 16, a home node 18, and one or more other nodes 20. The network 10 also includes a network interconnect 22 that enables communication between the nodes 12, 14, 16, 18, and 20. For example, the network interconnect 18 can be implemented as a switch fabric or a hierarchical switch. The other nodes 20 can correspond to one or more additional processors or other multi-processor systems (e.g., one or more symmetric multi-processor (SMP) nodes) connected to the network interconnect 22, such as through an appropriate interconnect interface (not shown). The network 10 further includes an owner predictor update component 24. The owner predictor update component 24 can be associated with the home node 18, distributed among one or more of the nodes 12, 14, 16, 18, and 20, or constitute a separate node within the network.

The nomenclature for the nodes 12, 14, 16, 18 and 20 in FIG. 1 is generally descriptive of the nodes relationship to a given line of data. As used herein, a node that issues a request, such as a victim, read, or write request, defines a source node or the requester 12. Other nodes within the network 10 are potential targets of the request, such as nodes 14, 16 and/or 20. Additionally, each memory block in the network 10 can be assigned a home node that maintains necessary global information and a data value for that memory block, such as node 18. A memory block can occupy part of a cache line, an entire cache line, or span across multiple cache lines. For purposes of simplicity of explanation, however, this disclosure assumes that a "memory block" occupies a single "cache line" in a cache or a single "memory line" in a memory, such as at the home node.

The network 10 implements a directory-based cache coherence protocol to manage the sharing of data to ensure coherence of the data. Generally, the protocol establishes rules for transitioning between states, such as when a line of data is read from or written to home 18 as well as the other nodes 12, 14, 16, or 20. As a given line of data changes state, the owner predictor update control 24 can provided updated information to owner predictors (not shown) at one or more nodes 12, 14, 16, and 20. For example, the owner predictor update control 24 can provide an update to the owner predictors each time a cache line transitions to a state in which it is associated with a single owner processor (e.g., an exclusive state or a modified state).

The network 10 can employ a directory-based protocol in which directory state information can be maintained at the home node 18. In a directory-based protocol, when the requester node 12 requires a copy of a memory block, the requester issues a request to the home node 18. The home node 18 includes resources (e.g., a directory in-flight table (DIFT)) to manage the requests for the associated data, including the request from the requester as well as from other possible requesters in the network 10. The home node also employs a directory to ascertain where in the network 10 a coherent copy of the requested data may be located for a given memory block.

The protocol ensures that any data returned to the requester 12 is coherent. The network 10 thus can utilize the protocol to reduce the perceived latency for obtaining a block of data. In an effort to reduce latency, the protocol enables the requester 12 to provide more than one request to selected nodes in the network 10. For example, the requester 12 can provide a first request to the home node 18 and a second request to the predicted owner 14 in parallel with the first request via the interconnect 22. The identity of the predicted owner 14 can be derived from an owner predictor (not shown) associated with the requesting node according to the information provided by the owner predictor update control 24. The first request can be provided to the home node 18 on a virtual request channel and the second request can be provided to the predicted owner 14 on a virtual forward channel. Thus, the first and second requests can be substantially concurrent requests provided via the interconnect 22 for the same line of data.

In response to the first request, the home node 18 employs a directory to determine whether an exclusive cached copy of the requested data exists in the network 10. Assuming that such a cached copy of the data exists, the home node 18 allocates an entry in a corresponding DIFT. The home node 18 employs the DIFT entry to serialize requests provided to the home node for the same block of data. The home node 18 then sends a request to the owner node 16 for the data via the network interconnect 22 over a virtual forward channel. The owner node 16 receives the forward request from the home node 18 and provides a corresponding response to the requester 12 over a virtual response channel of the network interconnect 22, which response may include a copy of the requested data. An update may also be provided to the home node 18 when the owner node 16 responds with data. The request transaction employing a request channel, forward channel and response channel corresponds to a typical three-hop transaction of a block of data. Those skilled in the art will appreciate that the protocol can be free of deadlocks because the protocol employs three message channels (or classes), namely, requests, forwards, and responses. The protocol further requires that the progress of a higher channel not be impeded by a blockage in a lower channel. In this example, it is assumed that the response channel is higher than both the forward channel and the request channel and that the forward channel is higher than the request channel.

In a situation when the predicted owner 14 is the owner node 16, the protocol establishes a race condition between the requester 12 and the home node 18 in which the first request to reach the owner will return a coherent copy of the requested data. Since the protocol ensures that any copy of data returned is coherent, the requester 12 can consume the first copy of data returned even in situations when more than one copy of data is returned. When the second request (the speculative request) arrives at the owner first, the data can be retrieved using two virtual channels, such as the forward channel and the response channel. A request transaction employing only the forward channel and response channel corresponds to a two-hop transaction that can often retrieve the block of data with reduced latency relative to the three-hop transaction mentioned above.

A speculative forward request to the predicted node 14 is not required to hit a valid target. If the predicted node 14 is not the owner node 16, the second request results in a miss and the coherent copy of the requested data will be returned using the three-hop approach mentioned above in response to the first request. The protocol further provides general maintenance procedures to manage and track the second request and responses to the request. The maintenance procedures, for example, can involve the predicted owner 14 notifying the home node 18 when the predicted owner provides a data response (e.g., at a cache hit) to the second request. When the predicted owner 14 does not include an exclusive cached copy of the data, the predicted owner responds to the forward request from the requester 12 with a miss response. Once the requested data has been provided to the requester node 12, the new state of the cache line can be provided to the owner predictor update control 24, and the owner predictor update control can provide update messages to the one or more owner predictors within the network 10.

Figure 2:
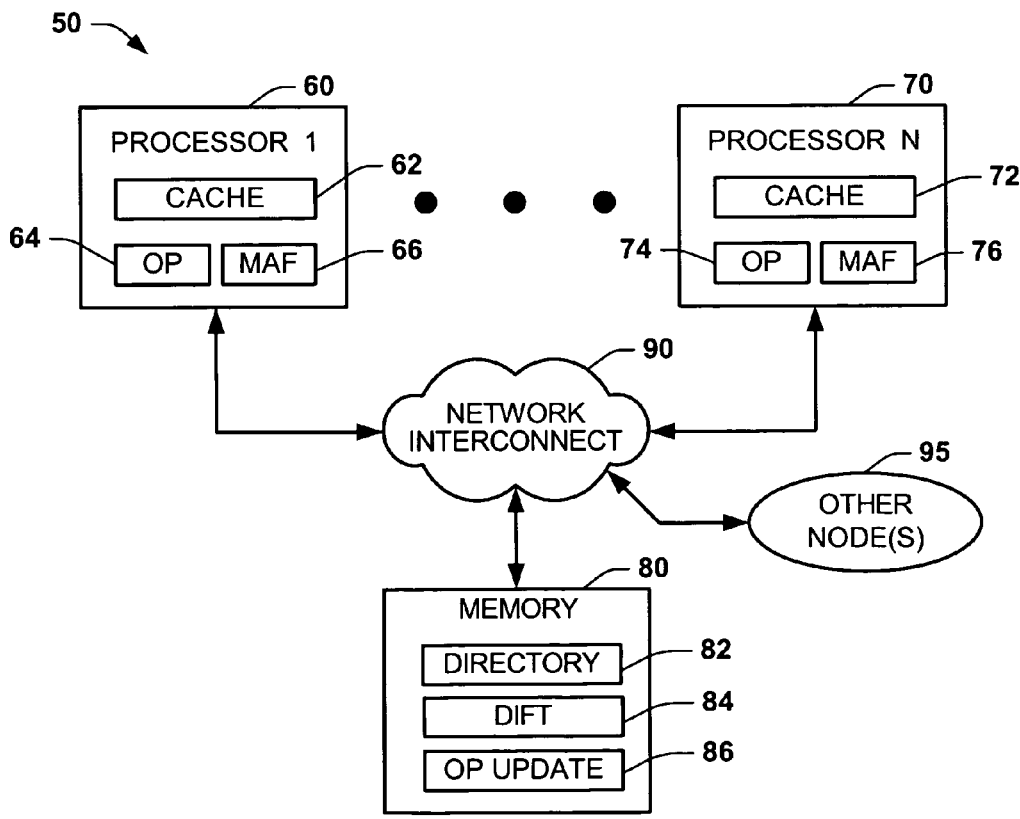
FIG. 2 depicts an example of another multi-processor network.

FIG. 2 depicts an example of another multi-processor network 50 that includes a plurality of processors 60 and 70 (indicated at PROCESSOR 1 through PROCESSOR N, where N is a positive integer greater than 1). The network 50 also includes memory 80, which can be implemented as a globally accessible shared memory. For example, the memory 80 can include one or more memory storage devices (e.g., dynamic random access memory (DRAM)). Those skilled in the art will understand and appreciate various memory configurations and implementations that can be utilized in the network 50.

The processors 60, 70 and memory 80 define nodes in the network 50 that can communicate with each other via a network interconnect 90. For example, the network interconnect 90 can be implemented as a switch fabric or a hierarchical switch. Also, associated with the network 50 can be one or more other nodes, indicated schematically at 95. The other nodes 95 can correspond to one or more additional processors or other multi-processor systems (e.g., one or more symmetric multi-processor (SMP) nodes) connected to the network interconnect 90, such as through an appropriate interconnect interface (not shown).

Each of the processors 60 and 70 includes at least one corresponding cache 62 and 72. For purposes of clarity, each of the respective caches 62 and 72 are depicted as unitary memory structures, although they may include a plurality of memory devices or different cache levels. Each of the caches 62 and 72 can include a plurality of cache lines. Each cache line has an associated tag address that identifies corresponding data stored in the line.

An owner predictor 64, 74 can be associated with each respective processor 60, 70. The owner predictors 64 and 74 may be of any suitable configuration to identify a predicted target node based on a request provided by the respective processor 60 and 70. The predicted owner can be the same for all requests issued by the requester. An owner predictor can be implemented as a cache-like structure that records ownership changes in one or more cache lines. An owner predictor is employed by its associated processor to identify one or more speculated targets to which a processor can send a request for data. The owner predictor can be provided with ownership information by an owner predictor update control 86 associated with the system memory 80. The owner predictor update control 86 provides update messages to one or more of the owner predictors 64 and 74 in response to a change of ownership related to a cache line within the network. The processors 60 and 70 thus can employ the owner predictors 64 and 74, respectively, to send requests to the one more speculated targets in parallel with a request to the home node.

Additionally or alternatively, the protocol can employ a command-type taxonomy to distinguish between a first subset of commands issued in connection with owner prediction (or speculation) and a second subset of commands issued without employing owner prediction. Accordingly, a given processor 60, 70 can selectively issue either a non-speculative or a speculative type of request for a given line of data. The owner predictor 64, 74 operate to identify one or more speculative target processors only when a request is issued with speculation.

Each cache 62, 72 can include a plurality of cache lines, each cache line including information that identifies the state of the data stored in the respective cache. A given memory block can be stored in a cache line of one or more of the caches 62, 72 as well as in a memory line of the memory 80, depending on the state of the line. Whether a cache line contains a coherent copy of the data depends on the state of the cache line. A selected subset of these states can further require that the data be written back to the memory 80 upon displacement, since the data may be more up-to-date than memory. For example, the network 50 can employ a "MESI" cache coherency protocol having the states for cached data in the network, as identified in Table 1.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in thesystem. The caching processor responds to forward requests by returning data and issues a downgrade message to memory upon displacement. |
| M | Modified - The cache line is valid and has been modified by the caching processor. The caching processor has the only cached copy in the system. The caching processor responds to forward requests by returning data and writes data back to memory upon displacement. |

Each processor 60, 70 also includes an associated miss address file (MAF) 64, 76. The MAF includes MAF entries associated with each pending transaction at a respective processor. The MAF entry includes fields that identify, for example, the address of the data being requested, the type of request (e.g., a normal command or a command involving prediction), and response information (e.g., including data, forwarding, and acknowledgements) received from other nodes in response to the request. An example of fields that can be implemented in a MAF entry to help provide for coherence and completeness of a MAF entry is provided below in Table 2. As used in the commands of Table 2 and commands contained in other tables herein, an asterisk symbol "*" denotes a wildcard. The wildcard can represent any one of plural different command terms used in place of the wildcard, such that the command containing the wildcard may correspond to other command types identified herein.

TABLE 2

| Field | Initial Value | Description |
|---|---|---|
| ReqType | Per request type | Encode request type. |
| DataResp | FALSE | Set TRUE by first data response (or by upgrade response). |
| HomeResp | FALSE | Set TRUE by non-speculative response. |
| SpecCnt | # | Initialize with the number of speculative forwards sent with transaction. Field can be zero for non-speculative requests. |
| SpecResp. | 0 | Number of speculative responses incremented by each speculative response (BlkSpec* or SpecMiss). |
| FillState | wait4resp | Determines state to fill cache; once coherent, mirrors cache state. |
| VicState | Idle | Use to resolve forward miss cases. |
| InvalCnt | 0 | Set by BlkExclCnt (See Table 6) with number of invalidates sent from directory. |
| InvalResp | 0 | Incremented by each Inval acknowledgment (InvalAck). |
| InvalPtr | 0 | A pointer to the source of a blocked Inval, plus a valid bit to indicate that the InvalAck is being withheld. May also need to include a transaction I.D. for use with the InvalAck. |

TABLE 2-continued

| Field | Initial Value | Description |
|---|---|---|
| Address | Per request | Record address of memory block. |
| Coherent | FALSE | Derived from above states: = Coherent, (DataResp & InvCnt = InvResp) |
| Complete | N/A | Derived from above states: = DataResp & HomeResp & InvCnt = InvResp & SpecCnt = Spec Resp. |

In the directory-based protocol of the system, the memory 80 can operate as the home node and include a directory 82. The memory 80 employs the directory 82 to ascertain where in the network 50 a coherent copy of the requested data should be located for each memory block. The directory 82 also includes directory state information that maintains a listing of nodes in the network 50 that include coherent copies of data and the particular state associated with the data (e.g., M, E or S-states). A directory in-flight table (DIFT) 84 can exist for a selected subset of memory lines at the memory 80. A directory controller at the home node employs the DIFT to manage and process transactions that have been forwarded to an exclusive cache copy (e.g., at an owner node). The DIFT 84 can be utilized to change the state of a given block of data in the directory 82 based on forward responses provided by other nodes in the network 50. The DIFT 84 also is operative to order requests at the home node when more than one concurrent request exists to the same line of data. Since the DIFT serializes home requests to the same block, the number of non-speculative forward messages is limited to no more than one per target for a given block of data.

A new entry can be allocated in the DIFT 84 if the directory state determines that a single exclusive copy of the requested block is cached remotely at an owner node (e.g., the processor 70 in the M or E-state). The entry is established in the DIFT 84 before a forward command is sent. For the example of a non-speculative request, the owner node will return a response to the requester in parallel with a message to the home node at the memory 80 that may contain modified data in response to the forward request. A directory controller can update the directory state information associated with the block of data in the directory 82 based on the response and the DIFT entry can be retired.

In another subset of non-speculative cases, the DIFT entry can intercept a victim message provided in the response channel to the same data as a pending DIFT entry. The victim can be paired with a FwdMiss response from the owner node, indicating that the targeted cache did not have ownership of the line when the forward was received from the home node. In an unordered network, such as the network 50, it is possible for either the victim or the FwdMiss to arrive at the DIFT entry first. Typically, after both the victim and FwdMiss have arrived at the DIFT entry, the memory 80 will have a coherent copy of the data, and can in turn provide the appropriate response to complete the request. The directory state can then be updated and the DIFT entry retired.

The owner predictor update control 86 can operate in cooperation with the directory 82 and the DIFT 84 to update the status of one or more cache lines at the owner predictors 64 and 74 distributed throughout the network 50. For example, the owner predictor update control 86 can provide an update message each time the directory 82 records a change in the ownership state of a cache line. Alternatively, the owner predictor update control 86 can provide an update message each time the directory 82 or the DIFT 84 record a cache line entering an exclusive or modified state with respect to a processor, referred to as an owner processor for that cache line. As another alternative, the owner predictor update control 86 can implement updates intermittently (e.g., at predetermined time intervals). The operation of the owner predictor update control 86 can depend on the condition of the network 50 at the time of the ownership change. For example, the volume of update messages can be reduced or eliminated entirely when the available bandwidth of the network is limited.

As described herein, the protocol implemented by the network 50 also affords a requesting processor the opportunity to issue requests with speculation. A request issued with speculation to the home node thus can also include a parallel speculative forward request to one or more predicted owners. When a speculative request is issued in parallel with a speculative forward request that results in a cache hit, the owner node having an exclusive cached copy sends a victim command in the response channel back the home node in parallel with the data response to the requester. However, instead of transferring ownership back to the home node, as in the non-speculative case noted above, the speculative response indicates that a new cached copy (e.g., either shared or exclusive) exists at the requester. Thus, when both the speculative victim response and the FwdMiss have arrived at the DIFT, the directory controller checks whether (i) the new cached copy matches the source of the request, or (ii) the new cached copy is for a different cache.

In a typical speculative case, there is a high likelihood that the source of the DIFT transaction will match the target of the speculative response, and the controller can update the directory state and retire the DIFT entry. In a less common scenario, the DIFT entry will have to be reset and a new forward request sent to a different target node. This latter scenario turns a typical three-hop request into a five-hop (e.g., increased latency) request. Those skilled in the art will appreciate, however, that the MAF controller employs rules that prevent another speculative forward from acquiring a cached copy of data while the MAF entry is pending. As a result, the latter scenario should not result in greater than five hops to complete.

There is one other race condition that is resolved by the DIFT. It is possible that a victim from the requester can issue and arrive at the DIFT before the response from the owner target node. In this case, memory is updated with any new data value, and the DIFT state marked to prevent the response from updating memory with stale data. The directory state is written to reflect the victim, once all responses have been collected. Table 3 below depicts examples of fields that can be utilized to implement entries in the DIFT 84.

TABLE 3

| Field | Description |
|---|---|
| ReqType | Encode the type of transaction |
| SourceID | Set to source (requester) when entry allocated. |
| TargetID | Initialize to identify owner processor specified by the directory. |
| NewTargetID | Set by a speculative victim response while DIFT entry is pending. |
| TgtVicState | Used to resolve target victim race cases. Initially set to Wait4Resp if SourceID = TargetID, or to VicPending otherwise. |
| SrcVicState | Used to resolve a race with a victim from the source. |
| TxnID | A transacting identifier for responses to the source (typically an index to the MAF entry). |

TABLE 3-continued

| Field | Description |
| --- | --- |
| Address | Implement with content addressable memory(CAM) to intercept commands to same block. |

The network 50 employs the protocol to manage the sharing of memory blocks so as to ensure coherence of data. Generally, the protocol can establish rules for transitioning between states, such as if data is read from or written to memory 80 or one of the caches 62 and 72. The network 50 can utilize the protocol to reduce the perceived latency of a request for a block of data.

By way of further example, a requester (processor 60) employs speculation to request a line of data not contained locally in the cache 62. Because the request includes speculation, the processor 60 employs the owner predictor 64 to identify one or more predicted owner processors. The processor 60 creates a corresponding entry in the MAF 66 associated with the speculative request, which can also identify the one or more predicted owners (See, e.g., Table 2).

The processor 60 provides two parallel requests across the network interconnect 90. The requester sends a first of the parallel requests (e.g., on a virtual request channel) to a home node located at the memory 80. The memory 80 employs the directory to ascertain (based on the state information in the directory 82) whether an exclusive cached copy exists in the network 50 (in the M or E-state). Assuming that an exclusive cached copy exists, the home node allocates an entry in the DIFT 84 (See, e.g., Table 3). The memory 80 sends a request (e.g., on a virtual forward channel) to the owner of the data (e.g., residing in one of the other nodes 95) via the network interconnect 90. The owner 95 sends the block of data to the requester 60 (e.g., over a virtual response channel) via the network interconnect 90. This corresponds to a typical three-hop transaction for a block of data.

The requester 60 sends the second parallel request directly (e.g., on a virtual forward channel) to a predicted owner (e.g., processor 70) via the network interconnect 90. For instance, the owner predictor 64 of the requester 60 can identify one or more predicted owners for the data required by the requester based on the updates provided by the owner predictor update control 86. The predicted owner can be same or different for each request and further can vary as a function of the request. Those skilled in the art will appreciate various approaches that can be utilized to determine one or more predicted owners for each given speculative request.

The predicted owner (processor 70) can provide a response to the second request that includes the block of data across of the network interconnect 90 if the predicted owner 70 is owner of the block of data. The owner prediction provides a 2-hop path (e.g., employing the forward and response channel) that potentially reduces the latency associated with retrieving the data. Additionally, when the prediction by the owner predictor results in a hit at the predicted node, the predicted node can provide a message to update the directory 82 in the memory 80. Depending on the timing of the acknowledgment message, the home node can either disregard the acknowledgement and request the data from the owner or it can respond to the first request directly via the network interconnect (e.g., employing the virtual response channel).

If the predicted owner 70 is not the owner node 95, however, the second request fails resulting in the predicted node providing a corresponding MISS response to the requester. If the second request fails, the first request will result in the requested data being returned to the requester in a three-hop path (e.g., employing the request, forward and response channels).

The system 50 thus typically does not produce a longer latency than the typical 3-hop path associated with the first request. The protocol helps ensures that any data returned to the requester is coherent. Accordingly, the requester can utilize the first copy of the requested data returned even though additional responses may be pending.

Figure 3:
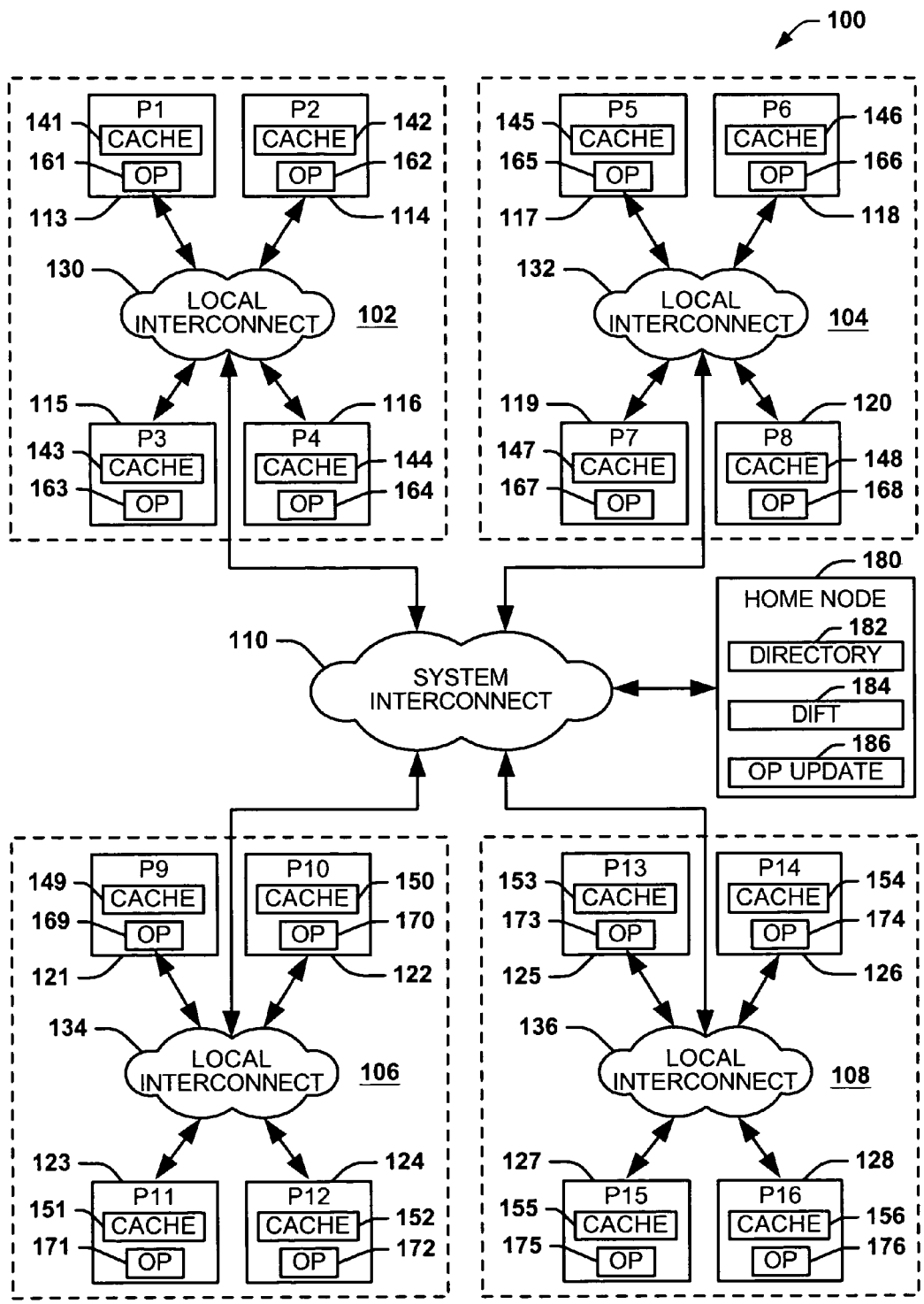
FIG. 3 depicts an example of yet another multi-processor network that can employ owner prediction.

FIG. 3 depicts an example of a multi-processor network 100 that can implement a directory-based cache coherency protocol employing owner prediction. The network 100 includes plural SMP (symmetric multi-processor) nodes 102, 104, 106, and 108 in communication with each other via a general interconnect 110. For example, the general interconnect 110 can be implemented as a switch fabric or hierarchical switch programmed and/or configured to manage transferring requests and responses among the nodes 102, 104, 106, and 108 and between a given node and one or more main memory structures. The main memory provides a shared structure that can comprise a central memory structure or a plurality of memory structures distributed throughout the network at one or more nodes. While four multi-processor nodes are depicted in the example of FIG. 3, those skilled in the art will appreciate that a greater or smaller number of nodes can be implemented within the network 100.

Each of the multi-processor nodes 102, 104, 106, and 108 includes a subset of a plurality of associated processors (P1 through P16) 113, 114, 115, 116, 117, 118, 119, 120, 121, 122, 123, 124, 125, 126, 127, and 128, with each subset of processors being interconnected by respective local interconnects 130, 132, 134, and 136. In the example of FIG. 3, a given node (e.g., 102) has four associated processors, but it will be appreciated that a node can have more or less than four associated processors and that the number of associated processors can differ across the multi-processor nodes 102, 104, 106, and 108. The local interconnects 130, 132, 134, and 136 facilitate the transfer of data between the processors in their respective nodes.

Each processor 113-128 includes an associated cache 141, 142, 143, 144, 145, 146, 147, 148, 149, 150, 151, 152, 153, 154, 155, and 156. The caches 141-156 can enable faster access to data than is available from the main memory. A given cache (e.g., 141) can contain one or more memory blocks. A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory. Each processor 113-128 also includes an associated owner predictor 161, 162, 163, 164, 165, 166, 167, 168, 169, 170, 171, 172, 173, 174, 175, and 176. In the illustrated example, the owner predictors 161-176 can include cache-like structures having one or more entries associated with respective cache lines. Each entry identifies one or more processors within the network likely to be the owner processor of its associated cache line (i.e., a predicted owner). An owner processor can be a processor having a coherent cached copy of a cache line in an exclusive or modified state. For some implementations of the owner predictors 161-176, processors having valid shared copies of the cache line can also be identified by the owner predictor. In the illustrated example, each entry identifies one likely owner processor for its associated cache line.

The example illustrated in FIG. 3 is a directory-based protocol designed to ensure coherency of data across the main memory and the plurality of caches 141-156 such that a request to a home node 180 will always return a coherent copy of the desired data. A home node 180 includes memory and an associated directory 182. The directory 182 indicates where a coherent copy of desired data should reside in the network 100. The coherent copy of data, for example, may reside in the system memory or, alternatively, in one of the caches 141-156. For example, a copy of a memory block stored within a cache (e.g., 141) can be modified by a processor (e.g., 113) associated with the cache. These modifications will not be reflected in memory until the processor 113 writes the modifications back to the memory. The cache coherency protocol prevents a second processor (e.g., 121) from reading the outdated version of the memory line in the memory. A transaction resource, such as a directory in-flight table (DIFT) 184, at the home node can also be used to help maintain coherency for a selected subset of memory lines at the home node 180. A controller within the directory 182 employs the DIFT to manage and process transactions associated with an exclusive cached copy (e.g., at an owner node).

In the illustrated example, the home node 180 further comprises an owner predictor update control 186. The owner predictor update control 186 provides update messages to one or more of the owner predictors 161-176 in response to a change of ownership related to a cache line within the network. For example, the owner predictor update control 186 can provide an update message each time a cache line changes its ownership state. Alternatively, the owner predictor update control 186 can provide an update message each time a cache line enters an exclusive or modified state with respect to a processor, referred to as an owner processor for that cache line. As another alternative, the owner predictor update control 86 can implement updates intermittently (e.g., at predetermined time intervals).

It will be appreciated that the update messages are not necessary for the network 100, as the protocol will ensure that coherent data is returned to a requester in the absence of correctly identifying a predicted owner. For instance, the owner predictor update control 186 can stop providing updates when the network is experiencing heavy bandwidth demands. As an example, the owner predictor update control 186 can monitor the available bandwidth of the network 100 and discontinue the update messages when the available bandwidth falls below a threshold value. Similarly, the owner predictor update control 186 can determine the frequency with which a given cache line is changing ownership and discontinue updates for the cache line when the frequency exceeds a threshold value. The threshold can represent a frequency at which the cache line is changing ownership too frequently for the update messages to effectively update the owner predictors 161-176.

The update messages broadcast by the owner predictor update control 186 can be broadcast generally to the processors 113-128 within the network 100 or can be targeted to one or more processors of interest. For example, when a cache line assumes an exclusive or modified state with respect to a given owner processor (e.g., 117), the owner predictor update control 186 can provide update messages to the local processors (e.g., processors within the same SMP node) 118, 119, and 120 of the owner processor. Alternatively, the owner predictor control 186 can select one or more processors that can be accessed with low response times for requests from the source processor.

In response to a cache miss on a desired cache line, a processor (e.g., 117) searches its associated owner predictor (e.g., 165) for an entry corresponding to the desired cache line. If an entry is found, the processor 117 selects the indicated owner processor as a speculated target processor for a request for the desired cache line. If no entry is found corresponding to the desired cache line, one or more default processors can be selected. For example, one or more local processors (e.g., 118, 119, and 120) associated with the requesting processor 117 can be selected when no predicted owner is available. Alternatively, the processor 117 can forego the selection of a target processor when no entry is available at the owner predictor.

The processor 117 then generates two parallel requests for the desired cache line, a first request (e.g., in a virtual request channel) to the home node 180 and a second request (e.g., in a virtual forward channel) to any predicted target processors. If no target processors are selected, the second request can be omitted and the processor will obtain the cache line via the home node 180 in accordance with the cache coherency protocol of the network. In response to the first request, the home node 180 retrieves the state of the cache line and the location of an owner node or processor, if any, associated with the coherent copy from the directory 182. If no owner is available (e.g., the cache line is not in a modified or exclusive state), the home node 180 can provide the cache line from main memory. If the cache line does have an associated owner processor recorded in the directory, the home node 180 provides a request (e.g., in the virtual forward channel) to the owner processor. The owner processor returns a coherent copy of the desired cache line to the source processor as a coherent data fill in accordance with the cache coherency protocol of the network 100.

The second request is provided to the predicted target processor(s). If any of the target processors is an owner processor for the desired cache line, it will provide the cache line to the requesting processor 117 and send a victim message to the home node 180 relinquishing its ownership of the cache line. Any target processors that are not owners of the desired cache line return speculative misses to the requesting processor 117. In the illustrated example, the second request can fail to result in a data response to the source processor (e.g., if all of the target processors return a miss). In such a case, the requesting processor 117 can utilize the copy provided via the home node 180 in response to the first request. If both requests return a cache line copy, the processor 117 can use the first response to arrive and disregard the second according to race protocols associated with the cache coherency protocol of the network 100.

Figure 4:
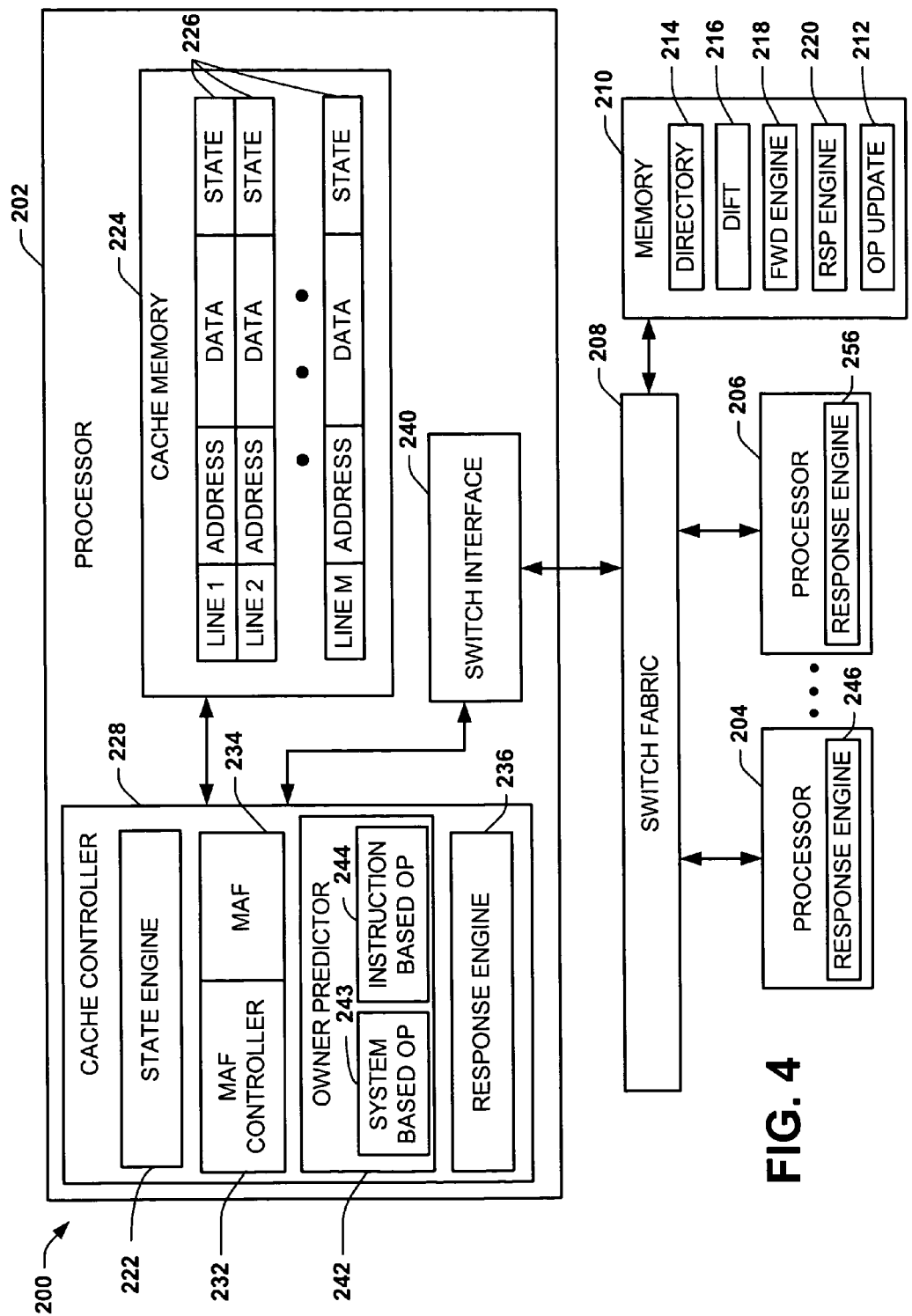
FIG. 4 depicts an example of a processor and memory within a multi-processor network.

FIG. 4 depicts another example of a multi-processor network that provides ownership updates for owner predictors associated with the processors within the network. The network 200 includes a plurality of processors 202, 204 and 206 in communication with each other via a switch fabric 208. There can be any number of two or more processors in the network 200. The network 200, for example, can be implemented as an integrated circuit or as circuitry (e.g., one or more circuit boards) containing plural integrated circuits. For instance, the plurality of processors can be arranged as a grid-like architecture, with each processor being coupled to one or more other processors through crossbar interconnections (not shown). For purposes of the following discussion, the processor 202 will be described with the understanding that the other processors 204 and 206 can be similarly configured.

The network 200 also includes associated memory 210, which can be organized as a single address space that is shared by the processors 202-206. The memory 210 employs a directory 212 to ascertain the home of requested data. The memory 210 can be implemented in a variety of known or proprietary configurations for storing selected data information for the respective processors 202-206 (e.g., at respective home nodes).

The processor 202 includes cache memory 224 that contains a plurality of cache lines 226 (e.g., lines 1 through M, where M is a positive integer greater than or equal to 1). Each cache line 226 can contain data that includes one or more memory blocks. An address can be associated with the data contained in each cache line 226. Additionally, each cache line 226 can contain state information identifying the state of the data contained at that cache line (See, e.g., Table 1).

A cache controller 228 is associated with the cache memory 224. The cache controller 228 controls and manages access to the cache memory 224, including requests for data, forwarding data to other nodes, and responses to requests from other nodes. The cache controller 228 communicates requests, forwards, and responses to the network 200 via a switch interface 240 that is coupled with the switch fabric 208. The switch interface 240, for example, includes an arrangement of queues (e.g., input and output queues) or other data structures that organize requests, forwards, and responses issued by the processor 202, as well as requests, forwards, and responses for execution by the processor.

In the example of FIG. 4, the cache controller 228 includes a state engine 230 that controls the state of each respective line 226 in the cache memory 224. The state engine 230 is programmed and/or configured to implement state transitions for the cache lines 226 based on predefined rules established by the system implemented in the network 200. For example, the state engine 230 can modify the state of a given cache line 226 based on requests issued by the processor 202. Additionally, the state engine 230 can modify the state of a given cache line 226 based on responses, forwards, or requests associated with the address of the given cache line. The responses, forwards, or requests can be provided, for example, by another processor 204, 206 and/or the memory 210.

The cache controller 228 also includes a miss address file (MAF) controller 232 and a MAF 234 employed by the MAF controller. The MAF 234 can be implemented as a table, an array, a linked list, or other data structure programmed to manage and track requests for each cache line 226. The MAF 234 contains entries for outstanding requests associated with a selected subset of the cache lines 226 of the cache memory 224 (See, e.g., Table 2). The MAF controller 232 employs the MAF 234 to manage requests issued by the processor 202, as well as responses or forwards as a result of such requests. For instance, a MAF entry collects network responses from other cache controllers and from main memory, maintains state and other information for the pending transaction, and interfaces with the cache controller when the request is coherent. For example, when the processor 202 implements a transaction or request associated with a given address line, the MAF controller 232 allocates a corresponding entry for the transaction in the MAP 234. The type of transaction can involve speculation or prediction.

In a typical implementation with the protocol, a MAF entry is pending in the MAF 234 until it is coherent. Sometimes, the MAF entry must buffer an early data response while other responses are collected. The MAF controller 232 cooperates with the state engine 222 to write the cache tags to the appropriate state, when data is filled into the cache memory 224. After all responses have been received to complete the request, the MAP entry is retired.

A MAF entry in the MAF 234 can receive multiple data responses, with the performance being enhanced by the ability to consume the first of these responses. Thus, the system 200 implements the MAF controller 232 with a relaxation of the 1st rule in the above list. For example, the MAF has two "pending" states: one that stipulates that a transaction is coherent, and another that stipulates that a transaction is complete. When the transaction is issued with speculation, the first data received can be consumed by the processor 202 since the protocol ensures that only coherent data is returned.

An example set of rules implemented for a MAF entry in the MAF 234 can be as follows:
1. As long as a MAF entry in the MAF 234 is not coherent, any requests to the same tag address are blocked from reading or writing the cached line 226.
2. As long as a MAF entry is not complete and not coherent, any requests to the same line in the cache (even if a different tag) are precluded from allocating a new MAF entry in the MAF 234. This rule may be relaxed by employing a tight coupling between the MAF entry and the architecture of the cache memory 224.
3. If all entries in the MAF 234 are not complete or not coherent, all requests to the cache are blocked. This rule can be relaxed by utilizing an alternative flow control apparatus so that hits to the cache memory 224 can proceed.

The processor 202 also includes an owner predictor 242 that can be utilized for transactions that the MAF controller 232 issues with speculation. The owner predictor 242 comprises a system-based owner predictor 243 and an instruction-based owner predictor 244. The system-based owner predictor 243 comprises a cache-like structure having one or more entries identifying respective cache lines. Each entry includes information that identifies a processor within the network likely to be the owner processor of its associated cache line. The information for each of the entries is provided to the system-based owner predictor 243 via an owner predictor update control 212 associated with a system directory 214. Whenever a cache line 226 assumes an exclusive or modified state with respect to an owner processor at the directory 214, the owner predictor update control 212 can broadcast an update message identifying the cache line and the owner processor to the system-based owner predictor 243 at the processor 202. These update messages are stored as entries, with older entries being overwritten according to a replacement protocol of the owner predictor assembly 242. The replacement protocol can comprise a first-in-first-out (FIFO) arrangement within the system-based owner predictor 243. Alternatively, the owner predictor 242 can prioritize the entries within the system-based owner predictor 243 to retain entries relevant to the present activity of the processor 202 while allowing less relevant entries to be overwritten.

The instruction-based owner predictor 244 predicts the owner of the cache line by observing the pattern of instructions within the processor 202. For example, the instruction-based owner predictor 244 can examine cache misses at the processor 202 to determine associations between individual static processor instructions to retrieve associated cache lines (e.g., load and store instructions) and to determine which processors own the desired cache line. If a given instruction repeatedly results in a cache miss that requires a cache line to be retrieved from a particular target processor, that target processor becomes a predicted owner during the next cache miss for that instruction.

The instruction-based owner predictor 244 operates with a low latency and does not require update messages across the switch fabric 208 of the network 200. Accordingly, the processor 202 can utilize the instruction-based owner predictor 244 when the available bandwidth across the network is low or when the ownership of a desired cache line has been changing rapidly. The system-based owner predictor 243 provides a more precise approach when the system has sufficient bandwidth to support the update messages from the owner predictor update control 212 and when the ownership of a cache line changes slowly enough to allow the updates messages to be received in a timely manner. The owner predictor assembly 242 can employ one or more metrics that allow the processor 202 to determine which of the instruction-based owner predictor 244 and the system-based owner predictor 243 is most suitable for a given cache line at any particular time. These metrics, for example, can include a metric for evaluating available network bandwidth, a counter that determines the number of updates received for the cache line over a given period, and a counter indicating the number of times the cache line has been retrieved by the processor over a given time period.

The instruction-based owner predictor 244 can also be utilized to manage the content of the system-based owner predictor 243. For example, the instruction-based owner predictor 244 can indicate cache lines that have been accessed recently by the processor 202. Entries within the system-based owner predictor 243 that correspond to these cache lines can be retained until replaced by a new update, as the processor 202 may be more likely to access these cache lines again. Entries corresponding to cache lines that the instruction-based owner predictor 244 does not recognize as having been recently accessed can be targeted for overwriting as new update messages are received at the system-based owner predictor 243.

As described herein, the processor 202 can employ a request-type taxonomy to selectively employ the owner predictor 242 for a selected subset of requests (e.g., requests issues with speculation). The determination of whether to issue a request with speculation can be made, for example, by the operating system and/or by the cache controller 228 when a given block of data is required by the processor 202. The owner predictor 242 provides an identifier (e.g., a processor ID) for each predicted node in the system to which a respective speculative forward request is to be provided. The MAF controller 232 thus can employ the identifier to send a speculative request(s) in the forward channel in parallel with a corresponding request issued with speculation in the request channel. The processor 202 sends such requests via the switch interface 240 and the switch fabric 208 to the predicted target nodes and to the home node. For example, when the MAF controller 232 detects that a request for a line of data includes speculation, a corresponding inter-processor message can be provided to the owner predictor 242. The owner predictor 242 returns the identifier (e.g., including a tag address and processor identification information) for each predicted node to which the speculative request(s) are to be provided. The MAF controller 232 sets appropriate values in the MAF entry fields (e.g., SpecCnt) and then sends the request (in the request channel) to the home node in parallel with the corresponding speculative command to one or more predicted owners (in the forward channel).

Table 4 lists examples of commands that can be implemented in a request channel of the system 200. These commands include transactions that involve issuing parallel associated forward channel commands to a predicted owner as well as transactions that do not involve parallel commands to a predicted owner. All the example commands in the request channel are sourced from the cache controller 228 (e.g., or other a caching agent) and target a directory controller at the home memory 210. The request channel can block in the event of conflicts or resource unavailability for a given transaction.

TABLE 4

| Command Name | Speculative | Description |
| --- | --- | --- |
| Read | No | A load request for data to be returned in either a shared or exclusive state when there is a local cache miss. |
| RdWSpec | Yes | Sent concurrently with speculative forwards (FwdReadSpec). |
| RdShd | No | Same as Read except that the block ends up in a shared state. |
| RdShdWSpec | Yes | Sent concurrently with speculative forwards (FwdRdShdSpec). |
| RdMod | No | A store miss request for data to be returnedin exclusive state. |
| RdModWSpec | Yes | Sent concurrently with speculative forwards (FwdRdModSpec). |
| Fetch | No | An uncached load request. |
| FetchWSpec | Yes | Sent concurrently with speculative forwards (FwdFetchSpec). |
| SharedtoDirty | No | A request to upgrade a shared copy to exclusive. |
| InvaltoDirty | No | A request to acquire an exclusive copy without a data response. |

The MAF controller 232 sends speculative forward commands to one or more targets, as identified by the owner predictor 242. Non-speculative forwards are sent from the directory controller of the memory 210 (home node) after it has been determined from the directory 214 look-up that there should be a cached copy of the requested data in the network 200. The directory 214 includes information that the directory controller can utilize to determine whether there is an exclusive owner of a cached block of data. The directory 214 employs a directory in-flight table (DIFT) 216 at the home node to manage and process transactions associated where an exclusive owner is present. The memory 210 employs a forward engine (e.g., associated with the directory controller) 218 that sends forward commands from the memory 210 to the exclusive owner via the switch fabric 208. The forward engine 218 can send a FwdRead, FwdRdShd, FwdRdMod, FwdFetch, or FwdInvaltoDirty command, as appropriate, to the exclusive owner (See, e.g., Table 5 below) in response to receiving a corresponding command in the request channel.

If there are no exclusive copies, there may be a list of caches that hold a shared copy of the block. This list also is recorded in the directory 214. Since the protocol does not require displacement from the cache of a line in the shared state to be communicated to the home node, the list of sharers maintained by the directory 214 may not be current. Also, for scaling the network 200 to a large number of caching agents, the directory 214 can abbreviate the sharer list to cover a superset of agents, only some of which may actually cache the block of data.

An invalid (Inval) command is a forward command sourced from the home node to invalidate shared copies. Since Inval commands are sourced from the home node, Inval commands are non-speculative commands. The target of the Inval command, however, may be a MAF with speculative responses pending or a MAF with no speculative responses pending. In the case that there are no speculative responses are pending, when an Inval arrives at a node with a pending MAF, the Inval changes state and returns an acknowledgement message (InvalAck) to the source of the request.

If the target of an Inval command has responses to speculated forwards pending, then the InvalAck is withheld. A pointer and state information can be updated in a corresponding entry of the MAF 234 to identify the source of the Inval command. After all speculative responses have been received by the MAF entry, the MAF controller 232 can apply the Inval and send the InvalAck to the source processor. By deferring the InvalAck response, some race conditions can be prevented, such as a race with another processor's non-speculative request. Only one generation of Inval commands should be pending in the network 200 at a given time.

As mentioned above, the processor 202 (as a requester) can send speculative commands in the forward channel to one or more predicted nodes, as identified by the owner predictor 242. Speculative forward commands can be provided when the MAF controller 232 is instructed to issue a command with speculation in the request channel. As listed below in Table 5, the owner predictor 242 can enable a requester to source the following commands: FwdRdSpec, FwdRdShdSpec, FwdRdModSpec, and FwdFetchSpec.

TABLE 5

| Command Name | Source | Description |
| --- | --- | --- |
| FwdRead | Directory | Sent from the directory controller to a caching agent that is identified as the exclusive owner of the block specified by a Read. The target may choose to migrate ownership to the requester, or keep a shared copy. |
| FwdRdSpec | Source Processor | Sent directly from the source to one or more targets, in search of an exclusive owner of the block. A RdWSpec is issued concurrently to the forward engine. |
| FwdRdShd | Directory | Sent from the forward engine to a caching agent that is identified as the exclusive owner of the block specified by a RdShd. The target may keep a shared copy. |
| FwdRdShdSpec | Source Processor | Sent directly from the source to one or more targets, in search of an exclusive owner of the block. A RdShdWSpec is issued concurrently to the forward engine. |
| FwdRdMod | Directory | Sent from the forward engine to a caching agent that is identified as the exclusive owner of the block specified by a RdMod command. The target invalidates its copy. |
| FwdRdModSpec | Source Processor | Sent directly from the source to one or more targets, in search of an exclusive owner of the block. A RdModWSpec is issued concurrently to the forward engine. |
| FwdFetch | Directory | Sent from the forward engine to a caching agent that is identified as the exclusive ownerof the block specified by a Fetch. The target may keep its copy without changing its state. |
| FwdFetchSpec | Source Processor | Sent directly form the source to one or more targets, in search of an exclusive owner of the block. A FetchWSpec is issued concurrently to the forward engine. |
| Inval | Directory | Sent from the forward engine to all caching agents that are listed with shared copies. Each target invalidates its copy. |
| FwdInvaltoDirty | Directory | Sent from the forward engine to a caching agent that is identified as the exclusive owner of the block specified by an InvaltoDirty. The target invalidates its copy. |

Messages in the forward channel (e.g., provided either by the forward engine 218 at the home node or by the owner predictor 242) do not block. The speculative forward command provided by the owner predictor 242 will thus return a data response to the requester (e.g., the processor 202) if the command successfully targets an exclusive copy. Non-speculative forward commands also result in a data response being provided to the requester in the desirable case that the target processor has the exclusive cached copy of the requested data. When a speculative forward command is sent to a processor that does not contain an exclusive copy of the requested data, a non-data SpecMiss response is returned to the requesting processor. In the event that the target processor no longer caches the exclusive copy of the requested data (or has a MAF entry pending for the requested data), a non-data FwdMiss response is returned to the home node (e.g., to the directory controller).In response to the FwdMiss, the DIFT 216 will block until a victim command from the target processor arrives at the home node (e.g., the directory controller). This victim command releases a blocked DIFT 216. The data is then forwarded from the home to the source of the DIFT and the request queue can once again progress.

Since the switch fabric 208 is an unordered network, it is unknown whether a forward request is intended for the pending data (e.g., a MAF request has been to the home) or for a previous, victimized, version of the data (e.g., MAF request may be blocked from allocating a DIFT entry). The resolution to any condition in which a non-speculative forward command sees a pending MAF is to change some state in the MAF and return FwdMiss to the home. When the data does arrive, the data is consumed by the cache and then is flushed out with a corresponding victim command. This victim command releases a blocked DIFT. The data is then forwarded from the home node to the source processor associated with the DIFT and the request queue can once again progress.

The response engine 236 controls responses provided by the processor 202. The processor 202 provides responses to forward channel commands received via the switch interface 240 from the memory 210 as well as from one or more other processors 204 and 206. The response engine 236, upon receiving a request from the network 200, cooperates with the state engine 230 and the MAF 234 to provide a corresponding response based on the type of request and the state of data contained in the cache memory 224. The processors 204 and 206 also include respective response engines 246 and 256. The memory 210 also includes a response engine 220 for issuing certain commands in the response channel, such as one or more of processors. For example, the response engine 220 can provide an invalidate acknowledgement command (InvalAck) as a response to enable a requester to cache an exclusive copy and to indicate that other cached copies of data have been invalidated. The response engines 220, 246 and 256 provide corresponding responses as response channel commands, which can include data or non-data responses.

Table 6 illustrates example commands that can be carried in an example response channel of the system 200. The response channel commands can be provided by a response engine of a target processor or from a home node when the directory 214 indicates that no exclusive copy of the requested data is cached. Response commands in this channel do not block other responses since response commands terminate either at a MAF entry, at a DIFT entry of a home node, or in the case of victims and write-backs, at the main memory.

TABLE 6

| Command Name | Has Data? | Description |
|---|---|---|
| BlkShd | Y | Data returned in response to a Read or a RdShd (or a RdWSpec or RdShdWSpec); block is cached in the shared state. |
| BlkSpecShd | Y | Data returned in response to a FwdRdSpec or FwdRdShdSpec; block is cached in the shared state. |
| BlkExclCnt | Y | Data returned in response to a Read or RdMod (or a RdWSpec or RdModWSpec); block is cached in the exclusive state. A count of the number of invalidates sent to sharers (0 if none sent) is included with the command. |
| BlkSpecExcl | Y | Data returned in response to a FwdRdSpec or FwdRdModSpec; block is cached in the exclusive state. |
| BlkInval | Y | Data returned in response to a Fetch (or a FetchWSpec); block is not cached. |
| BlkSpecInval | Y | Data returned in response to a FwdFetchSpec; block is not cached. |
| SpecMiss | N | Response returned for any Fwd*Spec command for which the target did not have the exclusive copy. |
| SpecAck | N | Response from the home for *WSpec requests for which the directory controller determines that data is being supplied by the target of a Fwd*Spec. |
| Victim | Y | A write-back to home of modified data from an owner that will no longer cache a valid copy. |
| VictoShd | Y | A write-back to home of modified data from an owner that will cache a non-exclusive shared copy. |
| VicClean | N | An update sent to the home from an owner to downgrade its cached copy from exclusive (non-modified) to invalid. |
| VicCleanToShd | N | An update sent to the home from an owner to downgrade its cached copy from exclusive (non-modified) to shared. |
| VicAckShd | Y | Sent to home in response to a FwdRead or FwdRdShd that hits modified state in the owner, indicating that the owner provided BlkShd and transitioned its cached copy to a shared state. |
| VicSpecShd | Y | Sent to home in response to a FwdRdSpec or FwdRdShdSpec that hits modified state in the owner, indicating that the owner provided BlkShdSpec and transitioned its cached copy to a shared state. VicSpecShd specifies the original source processor (e.g., by processor I.D.) |
| VicAckExcl | Y | Sent to home in response to a FwdRead or FwdRdMod that hits modified state in the owner, indicating that the owner provided BlkExclCnt and transitioned its cached copy to an invalid state. |
| VicSpecExcl | Y | Sent to home in response to a FwdRdSpec or FwdRdModSpec that hits modified state in the owner, indicating that the owner provided BlkExclSpec and transitioned its cached copy to an invalid state. VicSpecExclk specifies the original source processor (e.g., by processor I.D.) |
| FwdAckShd | N | Sent to home in response to a FwdRead or FwdRdShd that hits exclusive (non-modified) state in the owner, indicating that the owner provided BlkShd and transitioned its cached copy to a shared state. |
| FwdSpecShd | N | Sent to home in response to a FwdRdSpec or FwdRdShdSpec that hits exclusive (non-modified) state in the owner, indicating that the owner provided BlkShdSpec and transitioned its cached copy to a shared state. FwdSpec.Shd specifies the original source processor (e.g., by processor I.D.) |
| FwdAckExcl | N | Sent to home in response to a FwdRead or FwdRdMod that hits exclusive (non-modified) state in the owner, indicating that the owner provided BlkExclCnt and transitioned its cached copy to an invalid state. |
| FwdSpecExcl | N | Sent to home in response to a FwdRdSpec or FwdRdModSpec that hits exclusive (non-modified) state in the owner, indicating that the owner provided BlkExclSpec and transitioned its cached copy to an invalid state. FwdSpecExcl specifies the original source processor (e.g., by processor I.D.) |
| FwdAckInval | N | Sent to home in response to FwdFetch that hits exclusive or modified state in the owner, indicating that the owner provided BlkInval, but did not transitions the state of its cached copy. |
| FwdMiss | N | Sent to home in response to a non-speculative Fwd* in the event that the target does not have a cached copy in an exclusive or modified state. |
| ShdtoDirtySuccCnt | N | Sent from the home in response to ShdtoDirty, indicating that the source of the request is recorded as a sharer by the directory, and thus may successfully transition its state to exclusive. A count of the number of invalidates sent to sharers (0 if none sent) is included with the command. |
| ShdtoDirtyFail | N | Sent from the home in response to ShdtoDirty, indicating that the source of the request no longer has a valid cached copy and fails the upgrade request and re-issue as a RdMod. |
| InvtoDirtyRespCnt | N | Sent from the home in response to InvaltoDirty, indicating that the source of the request may successfully transition its state to exclusive. A count of the number of invalidates sent to sharers (0 if none sent) is included with the command. |
| InvalAck | N | Sent from the target of an Inval to the source MAF controller as an acknowledgement. |

The protocol enables the network 200 to reduce the perceived latency associated with a request for a block of data. By way of example, assume that the processor 202 requires a block of data not contained locally in the cache memory 224.

Accordingly, the processor 202 (as a requester) employs the MAF controller 232 to allocate an entry in the MAF 234 associated with a corresponding request for the required data. Assuming that the owner predictor 242 specifies a predicted target for the block of data, the MAF controller 232 employs the MAF entry to issue a request for the data (in the request channel) with speculation. For instance, the MAF controller 232 provides the request with a speculative attribute to a directory controller at the home node. Since the owner predictor 242 has identified a predicted owner (e.g., the request is issued with speculation-See, e.g., Table 2), the MAF controller 232 also issues a corresponding forward channel request to one or more predicted nodes in the system 200, as identified by the owner predictor for the block of data. As a result, two substantially concurrent requests are provided through the switch interface 240 and to the switch fabric 208. The concurrent requests include a first request to the home node (in the request channel) and a second speculative request to one or more predicted nodes (in the forward channel).

At the home node, a directory controller receives the request and performs a look up in the directory 212 to ascertain the location of the owner node (if any) for the requested data. Since the request includes the speculative attribute, the home node processes the request as being a transaction involving owner prediction. Assuming that the directory state information indicates that an exclusive cached copy of the requested data exits at an owner node, such as at the processor 204 (e.g., in the E-state), the directory controller employs the forward engine 218 to provide a corresponding forward channel request to the owner node 204 (See, e.g., Table 3). In response to the forward channel request from the home node, the response engine 246 accesses the cache line containing the requested data and provides a corresponding data response in the response channel (See, e.g., Table 4) to the requester. The response engine 246 can also perform any required state transition associated with the request, such as transitioning the cache line at the processor 204 from the E-state to the S-state. Examples of possible state transitions are provided below in Table 7. In a situation when no cached copy of the requested data exists in the system 200, the home node can employ the response engine 218 to provide response that includes a corresponding memory copy of the requested data to the requester 202 in the response channel via the switch fabric 208.

Assume that a speculative forward channel request is sent to the processor 206 concurrently with the request from the processor 202 to the home node. Continuing with the above example, since the processor 206 is not the owner of the requested data, the processor 206 responds to the forward channel request with a SpecMiss response via the response channel (e.g., see, Table 6). In circumstances when the owner predictor correctly identifies an owner node of the requested data, a race condition for the data can exist. This race condition, however, typically is between the forward channel speculative request from the requesting processor and the forward channel request from the home node in response to the original request that was issued with speculation. As mentioned above, the coherency protocol ensures that any coherent copy of the data returned to the requester (in the response channel) will be coherent.

For example, if the speculative forward channel request for the data from the requester arrives at the owner before the request from the home node, the owner node provides a corresponding response that includes a copy of the data. The owner also provides a corresponding message back to the home node. The message to the home node, for example, can identify the response as including data as well as the command type (or state) of the data response (e.g., a shared or exclusive copy). The directory controller at the home node thus can update the directory state information based on the owner message to the home node.

An example set of cache state transitions that can be employed by the network 200 for the type of source requests described above (Table 4) are provided below in Table 7. The protocol can employ a protocol optimization to cache data in the exclusive state if the directory indicates that there are no shared copies (e.g., sometimes referred to as private data optimized). The protocol can also employ a protocol optimization to cache data in the exclusive state if a previous owner caches the data in a modified state (a.k.a. migratory data optimized). Additionally, the protocol does not require a command to downgrade a shared copy to invalid nor is a command is required to modify an exclusive copy. Table 7 also demonstrates that a ShdtoDirty command will fail if an exclusive copy is cached remotely (e.g., because an Inval is likely on the way to the requester).

TABLE 7

| Source Command | Command Cache State | Next Source Cache State | Current Target Cache State | Next Target Cache State |
|---|---|---|---|---|
| Fetch or FetchWSpec/FwdFetchSpec | I | I | — | unchanged |
| RdShd or RdShdWSpec/FwdRdShdSpec | I | S | I | I |
|  | I | S | S | S |
|  | I | S | E | S |
|  | I | S | M | S |
| Read or ReadWSpec/FwdReadSpec | I | E | I | I |
|  | I | S | S | S |
|  | I | S | E | S |
|  | I | E[4] | M | I |
| RdMod or RdModWSpec/FwdRdModSpec or InvaltoDirtyReq | I | E | I | I |
|  | I | E | S | I |
|  | I | E | E | I |
|  | I | E | M | I |
| No command required | S | I | — | unchanged |
| ShdtoDirtyReq | S | E | I | I |
|  | S | E | S | I |
|  | S | S(I) | E, M | unchanged |
| VicClean | E | I | — | unchanged |
| VicCleantoShd | E | S | — | unchanged |
| No command required | E | M | — | unchanged |

TABLE 7-continued

| Source Command | Command Cache State | Next Source Cache State | Current Target Cache State | Next Target Cache State |
| --- | --- | --- | --- | --- |
| Victim | M | I | — | unchanged |
| VictoShd | M | S | — | unchanged |

Figure 5:
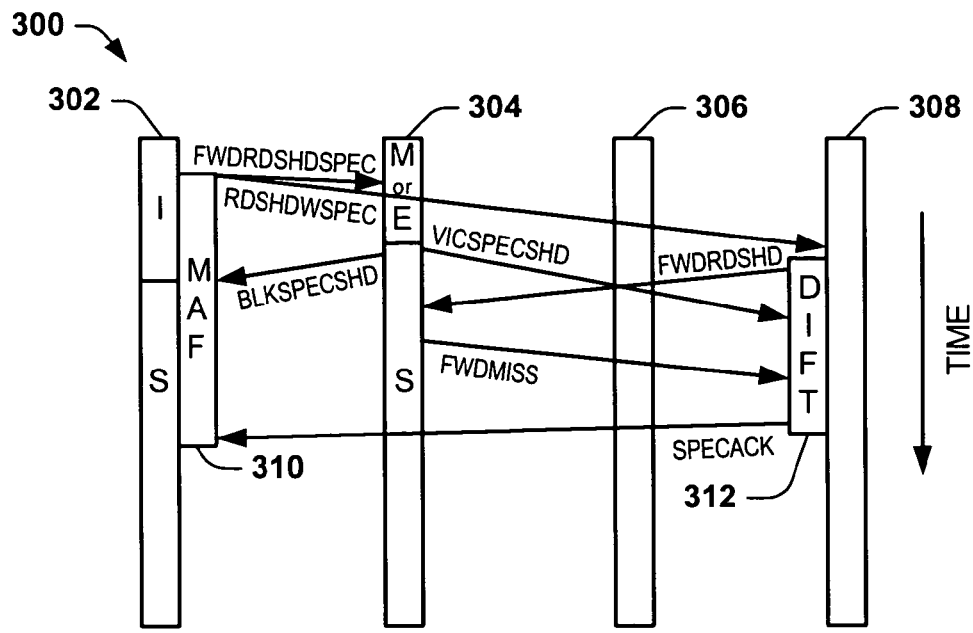
FIG. 5 depicts a first example of a timing diagram for a network.
Figure 6:
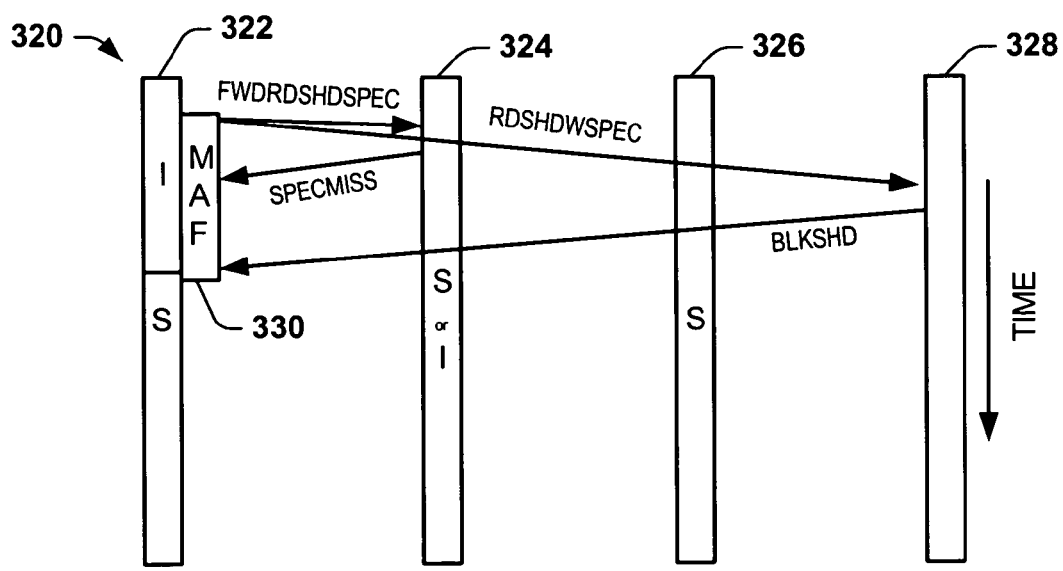
FIG. 6 depicts a second example of a timing diagram for a network.
Figure 7:
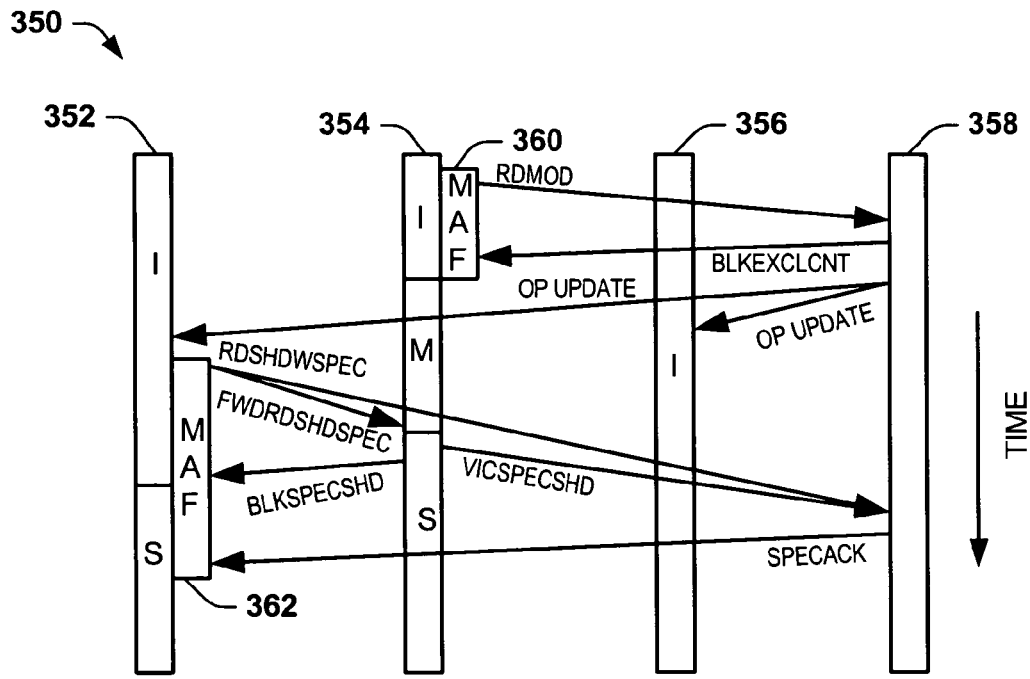
FIG. 7 depicts a third example of a timing diagram for a network.

In view of the foregoing structural and functional features described above, certain methods that can be implemented using a cache coherency protocol will be better appreciated with reference FIGS. 5-7. The examples in FIGS. 5-7 illustrate various interrelationships between requests, responses, state transitions, and owner predictor updates that can occur for a given memory address (e.g., memory line) in different processor caches or memory devices. In each of these examples, time flows in the direction of an arrow labeled "TIME." Those skilled in the art may appreciate various other cases that can be implemented using the protocols described herein. Additionally, the following methodologies can be implemented by hardware (e.g., as one or more integrated circuits or circuit boards containing a plurality of microprocessors), software (e.g., as executable instructions running on one or more processors or controllers), or any combination thereof.

FIG. 5 illustrates a multi-processor network 300 that includes a requester 302, a plurality of potential target nodes 304 and 306 and a home node 308. Initially, the nodes 302 and 306 are in the Invalid state for the block of data and the node 304 is in the M or E-state for the block of data. The node 302 allocates a MAF entry 310 associated with a speculative read (RDSHDWSPEC) command. An owner predictor (not shown) associated with the node 302 identifies the node 304 as a predicted node for the request. The node 302 thus issues the RDSHDWSPEC request to the home node 308 in parallel with a speculative forward read request (FWDRDSHDSPEC) to the predicted node 304.

In response to the FWDRDSHDSPEC command from the requester 302, the node 304 provides a data response (BLKSPECSHD) providing a shared copy of the data to the requester. The node 304 also transitions from the M or E-state to the S-state and issues a victim (VICSPECSHD) command to the home node 308. The requester 302 changes the state of the data at the requester 302 from the I-state to the S-state in response to the BLKSPECSHD response. The VICSPECSHD command provides the home node 308 with an up-to-date copy of the data as well as indicates that the block of data has been shared with the requester 302. The home node thus updates the directory state information associated with the data to identify the nodes 302 and 304 both as having shared copies.

In response to the RDSHDWSPEC command from the requester 302, the home node 308 allocates a DIFT entry 312 the request since the current state information indicates an exclusive cached copy at the node 304. After allocating the DIFT entry 312, the home node 308 issues a corresponding FWDRDSHD command to the owner of the block of data, namely the node 304. Since, at the time the node 304 receives the FWDRDSHD command, the node already has the data in the S-state, the node 304 issues a FWDMISS response to the home node 308. The home node 308 issues a SPECACK to the requester 302 acknowledging that the block of data has been provided by the predicted node 304. The home node 308 then retires the DIFT entry 312. In response to the SPECACK from the home 308, the requester retires the MAF entry 310.

In the example of FIG. 4, the speculative FWDRDSHDSPEC command results in a cache hit at the predicted node 304. Accordingly, the requester 302 receives the requested block of data with reduced latency than a situation requiring the read request to be provided first to the home node 308.

FIG. 6 illustrates an example of a multi-processor network 320 employing the protocol described herein. The network 320 includes a requester 322, a plurality of other processor nodes 324 and 326 and a home node 328. Initially, the requester 322 is in the I-state for the block of data, the processor node 324 could be in the S or I-state, and the processor node 326 is in the S-state.

The requester 322 allocates a MAF entry 330 associated with a speculative request. The requester 322 issues parallel requests, including a speculative read (RDSHDWSPEC) request provided to the home node 328 and a FWDRDSHDSPEC command provided concurrently with to the node 324 (as determined by an owner predictor). In response to receiving the FWDRDSHDSPEC command from the requester 322, the node 324 issues a SPECMISS command to the requester indicating that the target does not have a modified or exclusive copy of the block of data.

The home node 328 issues a corresponding BLKSHD response to the requester 322 in response to the RDSHDWSPEC command from the requester 322. The BLKSHD response includes a shared copy of the requested data. The home node 328 also updates the associated directory state information to identify the requester as having a shared copy. The requester 322 retires the MAF entry 330 in response to the BLKSHD response from the home node.

FIG. 7 illustrates another example of a network 350 implementing the protocol described herein. The network 350 includes a requester node 352, a plurality of potential target nodes 354 and 356 and a home node 358. Initially, the nodes 352, 354, and 356 are in the Invalid state for the block of data. A potential target node 354 requires write permission for the block of data and allocates a MAF entry 360. The node then issues a non-speculative request to the home node, namely a read-modify command (RDMOD). For the purpose of example, no speculative command is generated from the potential target node 354, since the request (RDMOD) was not issued with speculation.

The home node 358 responds to the RDMOD request to the request with a data response (BLKEXCLCNT) to the target node 354. The node 354 then transitions to a modified state and retires the local MAF entry 360 associated with the cache line. After providing the data response, an owner predictor update control (not shown) at the home node 358 generates update messages (OP UPDATE) to owner predictors (not shown) associated with one or more nodes 352 and 356 within the network 350. The OP UPDATE message includes a tag identifying the block of data and identification associated with the target node 354.

The requester node 352 allocates a MAF entry 362 and issues parallel requests to the target node 354 indicated by the update message provided to its associated owner predictor and to the home node 358. Specifically, the requester 352 sends a FWDRDSHDSPEC command to the target node 354 and a corresponding RDSHDWSPEC command to the home node 358 for the data.

In response to the FWDRDSHDSPEC command from the requester 352, the target node 354 issues a BLKSPECSHD command to the requester, providing a shared copy of the requested data to the requester 352. The state of the data at the requester 352 also transitions from the I-state to the S-state in response to the BLKSPECSHD command. The target 354 issues a VICSPECSHD command to the home node 358 concurrently with the BLKSPECSHD command and transitions from the M or E-state to the S-state. The VICSPECSHD command also provides a copy of the data to the home node 358 as well as indicates that a shared copy has been provided to the requester 352 and that the node 354 has transitioned to the S-state. The home node 358 updates the directory state information based on the information provided in the VICSPECSHD command.

In the example of FIG. 7, the home node 358 receives the VICSPECSHD substantially concurrently with (or prior to) the RDSHDWSPEC command from the requester 352. Consequently, the home node 358 updates the state information in the directory and issues a SPECACK command to the requester 352 indicating that another node is supplying (or has already supplied) the data. The requester 352 retires the MAF entry 362 after receiving the SPECACK command from the home node 358. The home node 358 can optionally provide an additional owner predictor update message to notify one or more of the plurality of potential target nodes (e.g., 356) that the requesting node 352 has a valid shared copy of the cache line.

Figure 8:
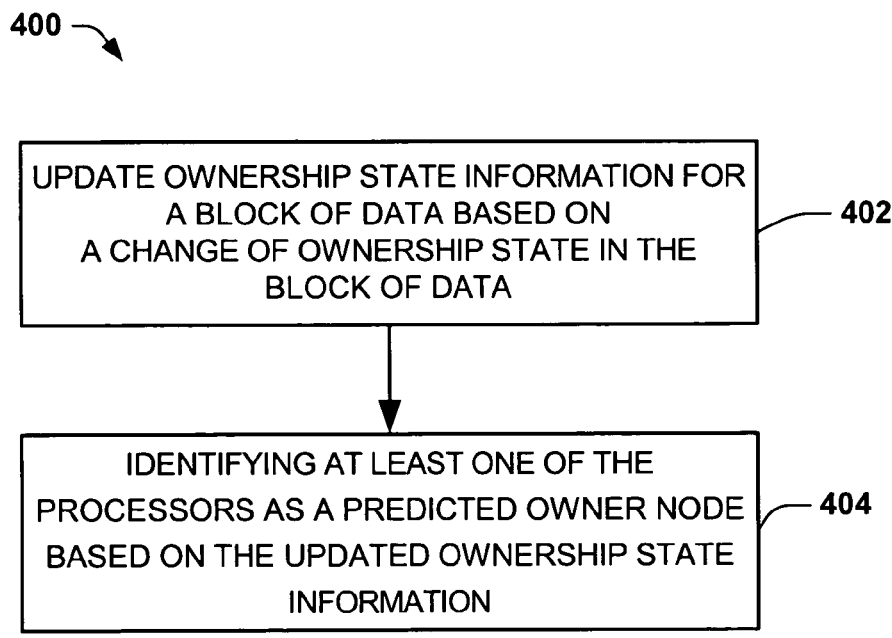
FIG. 8 depicts a flow diagram illustrating a method.

In view of the foregoing structural and functional features described above, certain methods will be better appreciated with reference to FIG. 8. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 8 depicts an example of a method 400 that includes updating ownership state information for a block of data at a plurality of owner predictors associated with respective processors based at least in part on a change in the ownership state of the block of data, as shown at 402. The method further includes identifying at least one of the processors as a predicted owner node based on the updated ownership state information in an owner predictor associated with the at least one of the processors, as shown at 404.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A multi-processor system comprising:
an owner predictor control that provides an ownership update message corresponding to a block of data to at least one of a plurality of owner predictors in response to a change in an ownership state of the block of data, the update message comprising an address tag associated with the block of data and an identification associated with an owner node of the block of data;
wherein a given one of the plurality of owner predictors, associated with a processor, comprises a first component that predicts an owner node of the block of data by observing the pattern of instructions within the processor and a second component that stores ownership update messages provided from the owner predictor control; and
a requesting node that provides a first request for the block of data to a home node, the requesting node being operative to provide a second request for the block of data to at least one predicted node in parallel with first request, the at least one predicted node being selected by an associated one of the plurality of owner predictors.

2. The system of claim 1, wherein the requesting node receives a coherent copy of the block of data from at least one of the home node and the at least one predicted node, the requesting node consuming a first coherent copy of the block of data received.

3. The system of claim 1, wherein a cached copy of the block of data exists at the owner node, the home node issuing a third request for the block of data to the owner node.

4. The system of claim 3, wherein the system employs a directory-based cache coherency protocol, the home node further comprising a directory that maintains directory state information associated with the block of data, the home node issuing the third request to the owner node based on the directory state information indicating that the owner node has an exclusive cached copy of the block of data.

5. The system of claim 3, wherein the owner node provides one of (i) a response to the home node and (ii) a response to the home node and to the requesting node, the owner node providing the response based on a state of the cached copy of the block of data at the owner node.

6. The system of claim 3, wherein the at least one predicted node comprises the owner node, the owner node having an exclusive cached copy of the block of data and providing a data response to the requesting node based on which of the second request and the third request arrives at the owner node first.

7. A multi-processor network comprising:
a first processor that includes a cache having a plurality of cache lines associated with respective blocks of data, one cache line in the cache of the first processor transitioning to an ownership state based on a response to a request provided by the first processor;
a second processor that includes an associated owner predictor;
an owner predictor control that broadcasts an update message to respective owner predictors associated with each of a plurality of processors comprising the multiprocessor network, including the owner predictor associated with the second processor to identify ownership for the one cache line consistent with the one cache line transitioning to the ownership state,
wherein the second processor provides a first request for data to the home node and a second request in parallel with the first request for the data at least one predicted node identified by the owner predictor.

8. The network of claim 7, the network further comprising a home node having a directory that includes directory state information associated with the plurality of cache lines, the directory state information being updated to reflect the one cache line transitioning to the ownership state, and the owner predictor control providing an update message in response to the updating of the directory state information.

9. The network of claim 8, further comprising an unordered network interconnect that enables communication of requests, responses, and update messages among at least the first processor, the second processor and the home node.

10. The network of claim 7, wherein the at least one predicted node comprises the first processor based on the update message.

11. A multi-processor network comprising:
a first processor that includes a cache having a plurality of cache lines associated with respective blocks of data, one cache line in the cache of the first processor transitioning to an ownership state based on a response to a request provided by the first processor;
a second processor that includes an associated owner predictor;
an owner predictor control that broadcasts an update message to respectively owner predictors associated with each of a plurality of processors comprising the multi-processor network, including the owner predictor associated with the second processor to identify ownership for the one cache line consistent with the one cache line transitioning to the ownership state,
wherein the owner predictor control monitors available bandwidth in the network and provides the update message based on the available bandwidth relative to a threshold value.

12. A system comprising:
a requesting node that provides a first request for a block of data to a home node, the requesting node being operative to provide a second request for the block of data to at least one predicted node substantially in parallel with first request, the requesting node receiving at least one coherent copy of the block of data from at least one of the home node and the at least one predicted node;
an owner predictor associated with each of a plurality of processor nodes that form the system, the owner predictor of the requesting node programmed to identify the at least one predicted node for servicing the first request; and
an update control that provides an ownership update message to the owner predictor associated with each of the plurality of processor nodes in response to a detecting a change in an ownership state for the block of data, the update message comprising an address tag associated with the block of data and a processor identification associated with an owner node of the block of data.

13. The system of claim 12, wherein the at least one coherent copy of the block of data is returned to the requesting node as a response in a response channel, the response being provided by the at least one predicted node.

14. The system of claim 12, wherein the home node provides a third request for the data to an owner node if the owner node has an exclusive cached copy of the requested data.

15. The system of claim 14, wherein the at least one predicted node comprises the owner node, the owner node providing a data response to the requesting node in response to which of the second request and the third request that arrives at the owner node first.

16. The system of claim 15, wherein the owner node provides a victim message to the home node and the data response to the requesting node in response to the third request arriving at the owner node prior to the second request, the home node providing a speculation acknowledgement to the requesting node in response to the victim message from the owner node.

17. The system of claim 15, wherein the owner node provides a victim message to the home node in response to the second request arriving at the owner node prior to the third request, the owner node also providing the data response to the requesting node in response to the second request from the requesting node.

18. The system of claim 12, wherein the at least one predicted node further comprises a target node having a cache that includes the data having one of an invalid state and a shared state, the at least one predicted node providing a miss response to the requesting node in response to the second request, and the owner node providing a data response to the requesting node in response to the third request.

19. A system comprising:
a requesting node that provides a first request for a block of data to a home node, the requesting node being operative to provide a second request for the block of data to at least one predicted node substantially in parallel with first request, the requesting node receiving at least one coherent copy of the block of data from at least one of the home node and the at least one predicted node;
an owner predictor associated with each of a plurality of processor nodes that form the system, the owner predictor of the requesting node programmed to identify the at least one predicted node for servicing the first request; and
an update control that provides an ownership update message to the owner predictor associated with each of the plurality of processor nodes in response to a detecting a change in an ownership state for the block of data, the update message comprising an address tag associated with the block of data and a processor identification associated with an owner node of the block of data,
wherein the home node provides a third request for the data to an owner node if the owner node has an exclusive cached copy of the requested data, and
wherein the first request is provided in a request channel, and the second and third requests are each provided in a forward channel.

20. A multi-processor system comprising:
means for identifying a predicted owner node associated with a block of data, a respective one of the means for identifying being associated with each of a plurality of nodes in the multi-processor system, including a requesting node;
means for selectively providing a first request for the block of data from the requesting node to the predicted owner node;
means for broadcasting updates to all the means for identifying in response to a change in ownership of the block of data, the means for updating being remote from the means for identifying;
means for providing a second request for the block of data from the requesting node to a home node, the second request being provided substantially in parallel with the first request; and
means for providing a coherent copy of the block of data to the requesting node in response to at least one of the first request and the second request.

21. The system of claim 20, further comprising:
means for ascertaining whether the predicted owner node has an exclusive cached copy of the block of data; and
means for providing a third request for the block of data from the home node to an owner node when the predicted owner node has the exclusive cached copy of the block of data.

22. The system of claim 20, wherein the means for updating comprises means for determining a frequency with which the block of data has changed ownership over a period of time, the means for updating being operative to update the means for identifying for a the block of data based on the determined frequency relative to a threshold frequency.

23. A method comprising:
- updating ownership state information for a block of data at a plurality of owner predictors associated with respective processors that form a multi-processor system based at least in part on a change in the ownership state information of the block of data;
- identifying at least one of the processors as a predicted owner node based on the updated ownership state information in a given one of the plurality of owner predictor associated with a respective processor;
- issuing a first request for the block of data from a requester to a home node;
- concurrently issuing a second request for the block of data from the requester to the predicted owner node based on the updated ownership state information; and
- receiving at least one coherent copy of the block of data at the requester from an owner processor, if the owner processor has an exclusive cached copy of the block of data, and from the home node, if no exclusive cached copy of the block of data exists when the home node receives the first request.

24. The method of claim 23, further comprising issuing a third request for the block data from the home node to the owner processor in response to determining that the owner processor has the exclusive cached copy of the block of data.

25. The method of claim 24, further comprising providing the at least one coherent copy of the block of data in response to the second request when owner processor receives the second request prior to the third request.

26. The method of claim 24, further comprising providing the coherent copy of the block of data in response to the third request when owner processor receives the third request prior to the second request.

27. A multi-processor system comprising:
- an owner predictor control that provides an ownership update message corresponding to a block of data to at least one of a plurality of owner predictors in response to a change in an ownership state of the block of data, the update message comprising an address tag associated with the block of data and an identification associated with an owner node of the block of data;
- wherein a given one of the plurality of owner predictors, associated with a processor, comprises a first component that predicts an owner node of the block of data by observing the pattern of instructions within the processor and a second component that stores ownership update messages provided from the owner predictor control, and
- wherein the owner predictor control is configured to discontinue providing the ownership update message corresponding to a given block of data based on (i) an available bandwidth in the system, and (ii) a frequency with which the given block of data changes ownership.

28. A multi-processor system comprising:
- an owner predictor control that provides an ownership update message corresponding to a block of data to at least one of a plurality of owner predictors in response to a change in an ownership state of the block of data, the update message comprising an address tag associated with the block of data and an identification associated with an owner node of the block of data;
- wherein a given one of the plurality of owner predictors, associated with a processor, comprises a first component that predicts an owner node of the block of data by observing the pattern of instructions within the processor and a second component that stores ownership update messages provided from the owner predictor control,
- wherein the owner predictor control is programmed to broadcast the ownership update message to each of the plurality of owner predictors to indicate the change in the ownership state of the block of data; and
- wherein the owner predictor control is configured to discontinue broadcasting the update message corresponding to a given cache line based on (i) an available bandwidth in the system, and (ii) a frequency with which the given block of data changes ownership.

* * * * *

UNITED STATES PATENT AND TRADEMARK OFFICE
CERTIFICATE OF CORRECTION

| | | |
|---|---|---|
| PATENT NO. | : 7,962,696 B2 | Page 1 of 1 |
| APPLICATION NO. | : 10/758368 | |
| DATED | : June 14, 2011 | |
| INVENTOR(S) | : Simon C. Steely, Jr. et al. | |

It is certified that error appears in the above-identified patent and that said Letters Patent is hereby corrected as shown below:

In column 29, line 5, in Claim 22, delete "a the" and insert -- the --, therefor.

In column 29, line 30, in Claim 24, delete "block data" and insert -- block of data --, therefor.

Signed and Sealed this
Sixth Day of December, 2011

David J. Kappos
*Director of the United States Patent and Trademark Office*